United States Patent [19]

Mitani

[11] Patent Number: 4,962,663
[45] Date of Patent: Oct. 16, 1990

[54] METHOD OF MEASURING ATMOSPHERIC PRESSURE FOR AN INTERNAL COMBUSTION ENGINE

[75] Inventor: Takeki Mitani, Hyogo, Japan

[73] Assignee: Mitsubishi Denki Kabushiki Kaisha, Tokyo, Japan

[21] Appl. No.: 423,678

[22] Filed: Oct. 18, 1989

Related U.S. Application Data

[63] Continuation of Ser. No. 159,089, Feb. 23, 1988, abandoned.

[30] Foreign Application Priority Data

Feb. 23, 1987 [JP] Japan .................................. 62-40960

[51] Int. Cl.$^5$ ............................................. G01M 15/00
[52] U.S. Cl. ..................................................... 73/115
[58] Field of Search ........................ 73/115, 116, 714; 123/478, 494, 412

[56] References Cited

U.S. PATENT DOCUMENTS

| | | | |
|---|---|---|---|
| 4,271,797 | 6/1981 | McCarbery | 123/412 |
| 4,388,825 | 6/1983 | de Valpillieres | 73/115 |
| 4,475,381 | 10/1984 | Nakatomi et al. | 73/115 |
| 4,600,993 | 7/1986 | Pauwels et al. | 123/412 |

FOREIGN PATENT DOCUMENTS

205832 9/1986 Japan .

*Primary Examiner*—Robert Raevis
*Attorney, Agent, or Firm*—Sughrue, Mion, Zinn, Macpeak & Seas

[57] ABSTRACT

According to the present invention, a method of measuring atmospheric pressure for a combustion engine having a suction pipe connected to it is accomplished by first providing a sensor for detecting negative pressure in the suction pipe. Next, a maximum ripple value of an output of the sensor means is measured when an operating condition of the engine becomes a predetermined one, to thereby determine the atmospheric pressure.

5 Claims, 2 Drawing Sheets

METHOD OF MEASURING ATMOSPHERIC PRESSURE FOR AN INTERNAL COMBUSTION ENGINE

This is a continuation of application Ser. No. 07/159,089, filed Feb. 23, 1988, now abandoned.

BACKGROUND OF THE INVENTION

The present invention relates to a method of measuring atmospheric pressure, and particularly relates to a method of measuring atmospheric pressure necessary for computing a fuel quantity in an internal conbustion engine by use of measurement of negative pressure in a suction pipe.

FIG. 1 is a diagram illustrating a basic arrangement of a suction system of an engine, and is also utilized for explanation of the atmospheric pressure measuring method according to the present invention which will be described later.

In FIG. 1, a suction pipe 2 is connected to an air cleaner 1 for eliminating dust in the air.

The suction pipe 2 is provided with an injector 3 and a throttle valve 4. The injector 3 is controlled by a computer described later so as to inject gasoline fuel. The throttle valve 4 is manually operated by an operator. The opening of the throttle valve 4 is converted into a voltage signal by a throttle opening sensor 5 to be outputted therefrom.

A boost sensor 6 is arranged to detect the pressure (mainly negative pressure) in the downstream of the throttle valve 4 of the suction pipe 2. The temperature of suction air in the suction pipe 2 is measured by a suction temperature sensor 7. On the other hand, the temperature of cooling water for an engine 10 is detected by an engine water temperature sensor 8.

An intake-manifold 9 distributes a mixture of air from the air cleaner 1 and gasoline injected from the injector 3 to the engine 10.

An exhaust gas burnt in the engine 10 flows out through an exhaust-manifold 11.

A computer 12 receives signals from the throttle opening degree sensor 5, the boost sensor 6, the suction temperature sensor 7, and the engine water temperature sensor 8 and signals from a not-shown ignition system so that the computer 12 computes the rotational speed of the engine and provides instructions to the injector 3, etc. on the basis the received signals. An atmospheric pressure sensor 13 supplies atmospheric pressure information to the computer 12.

Next, the operation of the system will be briefly described. The respective outputs of various sensors including the throttle opening degree sensor 5, the boost sensor 6, the suction temperature sensor 7, the engine water temperature sensor 8, the atmospheric pressure sensor 13, and O$_2$ sensor (not shown), an EGR opening degree sensor (not-shown), an engine rotational speed detector (not shown), and so on, are inputted to the computer 12 so as to evaluate the operating condition of the engine.

The computer 12 determines, from the signals of the various sensors, a predetermined optimum quantity of fuel injection so as to send an electric signal to the injector 3, and at the time sends signals to other actuators to control them so that the exhaust gas, fuel efficiency, driving feeling, and so on, of the car are made to be always optimum.

In the method of measuring atmospheric pressure in the conventional system, there have been problems in that the atmospheric pressure sensor 13 which has the same structure as the boost sensor 6 is separately provided to measure atmospheric pressure, that is, two sensors of the same kind are required to be provided, so that the system is expensive and an excessive space is required. Moreover, there are variations in characteristics between the two sensors so that the accuracy of the measurement is deteriorated.

As disclosed in a prior art reference (Japanese Patent Unexamined Publication No. 61-205832), there has been proposed a method in which a single boost sensor 6 is used and the boost pressure output is operated to calculate atmospheric pressure. This method, however, has a problem that the frequency of detection of atmospheric pressure is low because an average value of the output of the boost sensor is considered.

SUMMARY OF THE INVENTION

It is therefore an object of the present invention to solve the foregoing problems in the prior art.

It is another object of the present invention to provide a method of measuring atmospheric pressure which utilizes measurement of suction pipe negative pressure, which is inexpensive, which can reduce the space, and which can be performed accurately.

In order to attain the foregoing objects, the present invention provides a method of measuring atomspheric pressure by using measurement of negative pressure in a suction pipe, in which a maximum ripple value of an output of a boost sensor for measuring the suction pipe negative pressure is read as a value of atomspheric pressure when respective outputs of various sensors become predetermined conditions.

Therefore, according to the present invention, since the maximum ripple value of an output of a boost sensor for measuring the suction pipe negative pressure is used, the atmospheric pressure is measured on the basis of the engine condition.

Other features and advantages of the present invention will be apparent from the following description taken in connection with the accompanying drawings.

DETAILED DESCRIPTION OF THE PREFERRED EMBODIMENT

An embodiment of the method of measuring atmospheric pressure by use of measurement of suction pipe negative pressure according to the present invention will be described with reference to the drawings.

Figure 1:
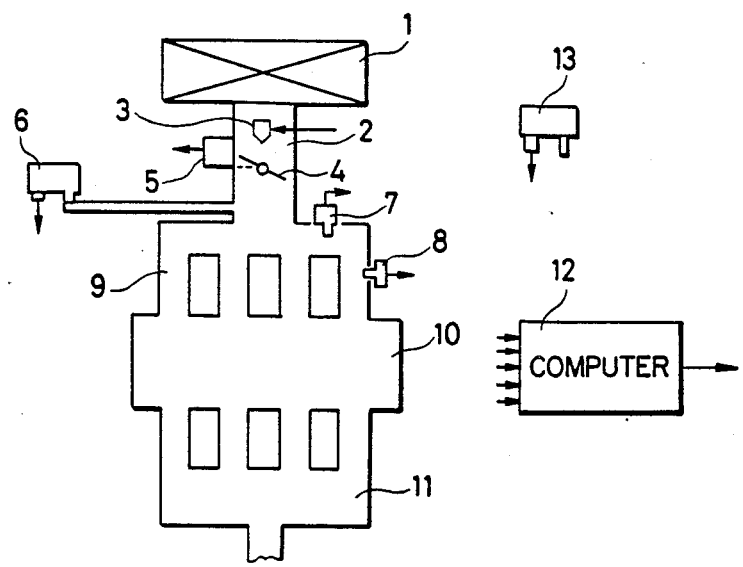
FIG. 1 is a system diagram which mainly shows a conventional suction system of an internal combustion engine, and which is also used to explain an embodiment of the method of measuring atmospheric pressure by use of measurement of suction pipe negative pressure according to the present invention.

As described above, a suction system of an engine to which the present invention is applicable may be the same as that illustrated in FIG. 1. Accordingly, the embodiment of the present invention will be described by use of FIG. 1 again together with the waveform diagram of FIG. 2.

Figure 2:
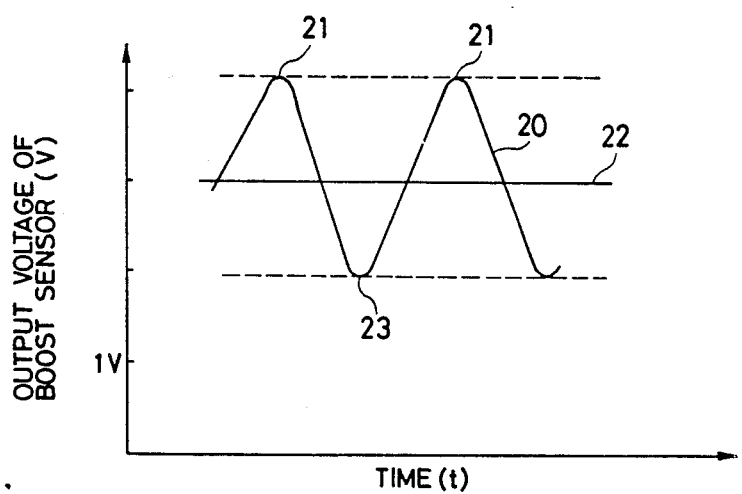
FIG. 2 is a waveform diagram for explaining the embodiment of the present invention.

In FIG. 2, the abscissa represents time and the ordinate represents an output voltage of the boost sensor 6. The reference numeral 20 represents a voltage waveform of an output of the boost sensor 6 in a certain operating condition, 21 represents a maximum ripple value and 23 represents a minimum ripple value.

The voltage waveform 20 is put into the computer 12 so that an average voltage 22 is formed by a not-shown smoothing circuit in the computer 12, the average voltage 22 being stored as a given voltage value.

The reason why the output of the boost sensor 6 has such a voltage waveform 20 as shown in FIG. 2 is that each cylinder of the engine 10 is equipped with a valve (not shown) which switches on/off of flowing-in of an air-fuel mixture. When the valve is being opened, the output of the boost sensor 6 takes a minimum ripple value 23 corresponding to excessively negative pressure.

When the valve is closed, on the contrary, the movement of the air-fuel mixture being sucked is stopped, so that the wave form 20 takes a maximum ripple value 21. The maximum ripple value 21 depends on the rotational speed of the engine, the opening of the throttle valve 4, and morever the temperature condition of the engine. However, it was confirmed on experiment that a maximum ripple value shows a valve which is extremely approximate to the atmospheric pressure. It was also confirmed that the condition of atmospheric pressure can be detected with good reproducibility if the condition of the engine is made to be the same.

Figure 3:
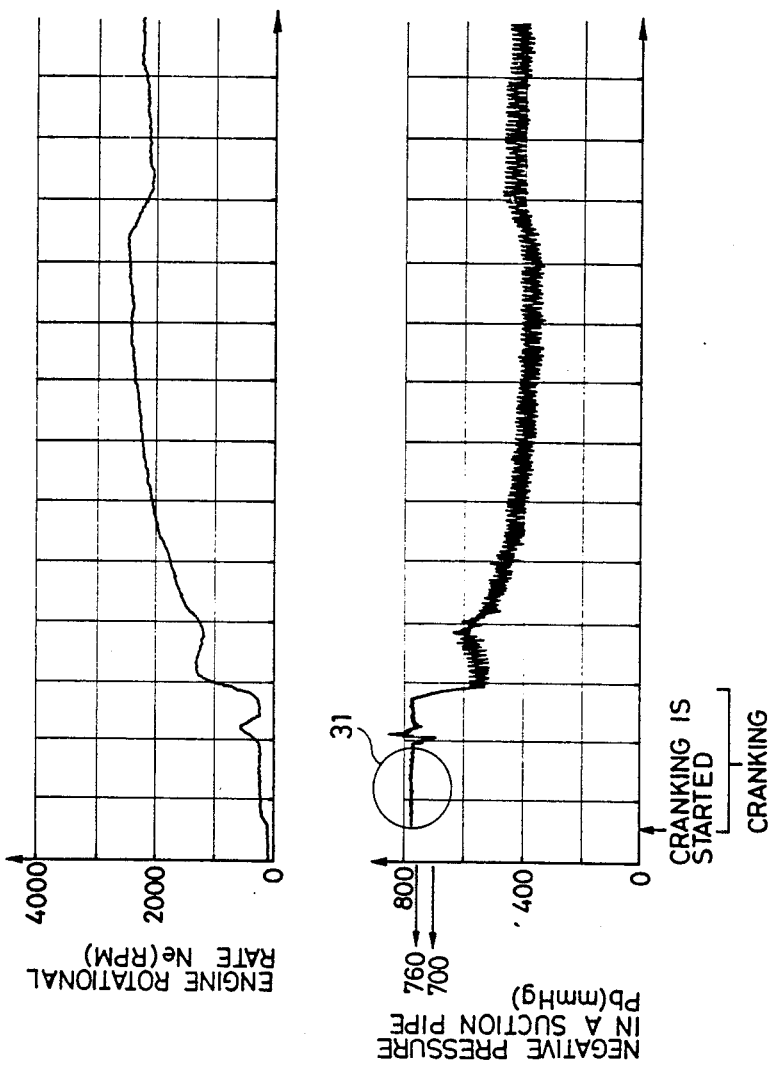
FIG. 3 shows a result of experiment conducted for confirming the present invention.

FIG. 3 shows the result of an experiment confirming that the maximum ripple value obtained while the engine is running is closely approximate to the atmospheric pressure. FIG. 3 shows the engine rotational rate and the negative pressure in the suction pipe which were obtained when the engine was started, i.e., at the time of cranking. A portion 31 in FIG. 3 is enlarged to be shown in FIG. 2 which shows that the maximum ripple value shows a value closely approximate to the atmospheric pressure.

Furthermore, it was also confirmed on experiment that the maximum ripple value shows the atmospheric pressure also when the throttle valve 4 is opened almost completely. In this case, although conditions required are different from one another according to the kinds or types of the engine, the condition for one engine is determined to a certain one in accordance with the output values of the several kinds of sensors provided in the engine.

Although the embodiment describes the case where an injector is arranged in the upstream of a throttle valve, the injectors may be arranged separately for respective cylinders in the intake manifold 9. Furthermore, if atmospheric pressure can be detected accurately by any one of the various sensors for setting the engine conditions, unnecessary one or ones of the sensors may be omitted.

Moreover, the embodiment is described as to the case of a computer for fuel injection, the same effect is obtained if atmospheric pressure is meansured by use of any other boost sensor for any other purpose (for example, for meter indication).

Since the method according to the present invention is arranged so that atmospheric pressure can be measured by use of a boost sensor for measuring suction pipe negative pressure, as described above, the equipment can be made inexpensive, the measurement can be carried out accurately, and the space can be reduced.

Moreover, since a maximum ripple value of an output voltage waveform of a pressure sensor is read to detect atmospheric pressure, there are advantages that atmospheric pressure can be read frequently and that it is unnecessary to give a burden on software since it is unnecessary to make a computer to operate complex processing.

What is claimed is:

1. A method of measuring atmospheric pressure for a combustion engine having a suction pipe connected thereto, comprising the steps of:
   providing a first sensor means for detecting negative pressure in the suction pipe; and
   measuring a maximum ripple value of an output voltage of said first sensor means when the engine is first turned on after having been in a non-rotating state, to thereby determine the atmospheric pressure.

2. A method of claim 1, including second sensor means, wherein said measuring step comprises measuring the maximum ripple value of said first sensor means when respective outputs of said second sensor means connected to said combustion engine become predetermined conditions.

3. A method of claim 1, wherein the sensor means comprises a boost sensor.

4. In a combustion engine having a suction pipe connected thereto, a system for measuring atmospheric pressure comprising:
   sensor means provided at the suction pipe for detecting negative pressure in a suction pipe and generating an output voltage; and
   means for measuring a maximum ripple value of said output voltage of said sensor means when the engine is first turned on after having been in a non-rotative state, such maximum ripple value of said sensor means output voltage being extremely approximate to atmospheric pressure.

5. A system of claim 4, wherein said sensor means comprises a boost sensor.

* * * * *